July 7, 1970   Z. J. JANIA   3,519,987

DECELERATION INDICATOR FOR AN AUTOMOTIVE VEHICLE

Filed May 2, 1966   2 Sheets-Sheet 1

INVENTOR
ZBIGNIEW J. JANIA

BY
John R. Faulkner
Keith L. Zerschling
ATTORNEYS

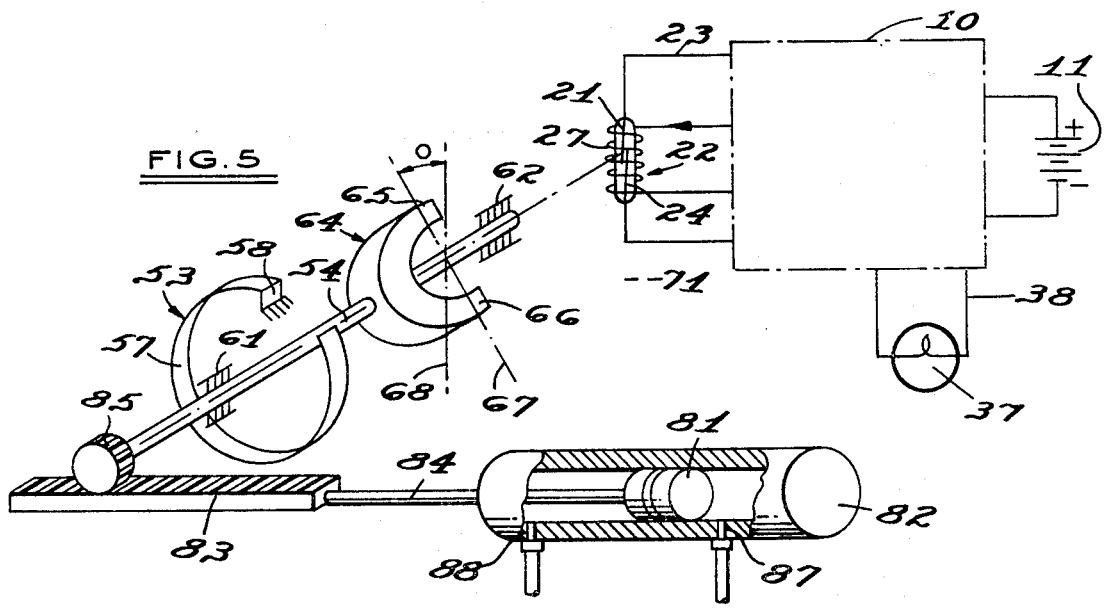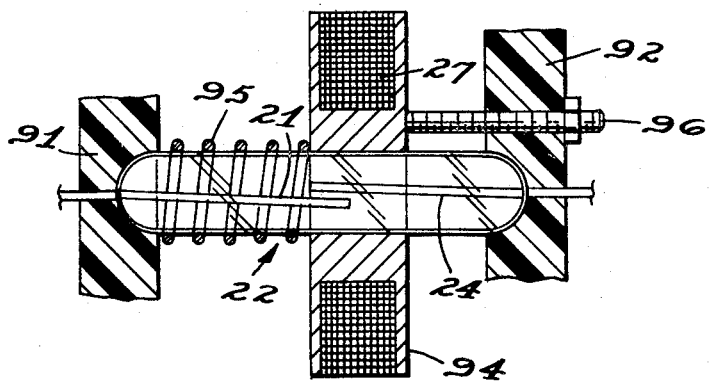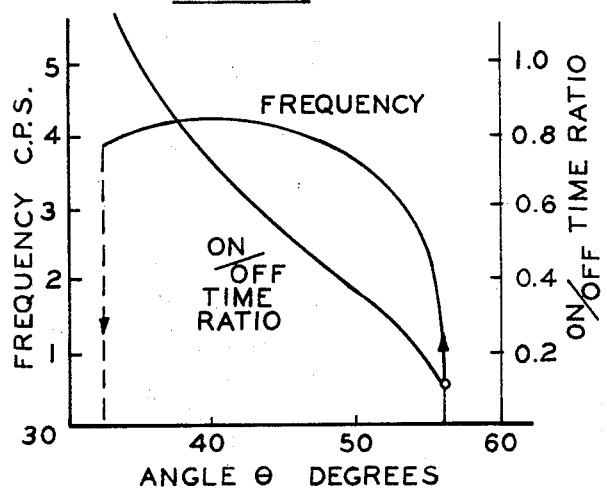

United States Patent Office 3,519,987
Patented July 7, 1970

---

3,519,987
DECELERATION INDICATOR FOR AN AUTOMOTIVE VEHICLE
Zbigniew J. Jania, Detroit, Mich., assignor to Ford Motor Company, Dearborn, Mich., a corporation of Delaware
Filed May 2, 1966, Ser. No. 546,742
Int. Cl. B60q 1/26
U.S. Cl. 340—72                                    7 Claims

ABSTRACT OF THE DISCLOSURE

A deceleration indicator for an automotive vehicle in which a rear lamp on the vehicle is flashed at a frequency which is a continuously varying function of the magnitude of vehicle deceleration and in which the duty cycle of the flashing lamp may also be a continuously varying function of the magnitude of the deceleration of the vehicle.

---

This invention relates to a deceleration indicator for an automotive vehicle, and more particularly to such a deceleration indicator in which a rear lamp on an automotive vehicle is flashed at a frequency which is a function of the magnitude of the vehicle deceleration and in which the duty cycle of the flashing of the lamp may also be a function of the magnitude of the deceleration of the vehicle.

The invention has the advantage over known deceleration indicators of providing a desired psychological effect on the driver of the car following the decelerating vehicle by flashing the lamp at a frequency that is a function of the vehicle deceleration. In other words, as vehicle deceleration increases the frequency of the flashing lamp increases thereby clearly indicating to the driver of the vehicle following the decelerating vehicle the magnitude of the deceleration to permit him to take proper braking or evasive action. Furthermore, the invention has the advantage over known devices of providing a duty cycle for the flashing lamp as a function of the deceleration of the decelerating vehicle. In other words, the on-time of the flashing lamp compared to its off-time is increased as the vehicle deceleration is increased. This phenomenon also has a pronounced and desired psychological effect on the driver of the car following the decelerating vehicle.

In the invention, an oscillating circuit is coupled to a lamp mounted on the rear of the vehicle which may be the tail or brake lamps currently employed in conventional automotive vehicles. Means are coupled to the oscillating circuit and the flashing lamp for increasing the frequency and/or the duty cycle of the oscillating circuit as a function of the deceleration of the vehicle. In the preferred form of the invention, the oscillating circuit takes the form of a reed switch device coupled to a source of electrical energy. The reed switch has a winding positioned about a pair of reeds with a capacitor or means connected across the winding for applying a predetermined fraction of the terminal voltage of the vehicle storage battery to this winding when the reeds are open. This voltage is selected so that it produces insufficient magnetomotive force on the reeds of the reed switch to close them.

A permanent magnet is positioned in the automotive vehicle in close proximity to the reed switch, and means are employed to vary the magnetic field or magnetomotive force applied to the reed switch from the permanent magnet as a function of the deceleration of the vehicle. This magnetic field or magnetomotive force is poled to aid the magnetomotive force developed by the winding of the reed switch. Under a certain minimum deceleration, the magnetomotive force applied to the reed switch by the permanent magnet is sufficient together with the magnetomotive force applied by the winding to close the reed switch. The means connected across the winding, for example, a capacitor, is also coupled to the reeds of the reed switch so that the capacitor discharges through the reeds thereby lowering the current flow through the winding and reducing the magnetomotive force applied to the reeds.

In a reed switch, it is known that it takes a greater amount of magnetomotive force to close the reeds than it does to hold them in the closed position. Therefore, upon the discharge of the capacitor and the reduction of the magnetomotive force, the magnetomotive force on the reeds will be reduced to the point where the reeds will open. The means or capacitor connected across the winding of the reed switch will, therefore, begin to charge and to apply an increasing voltage to the winding thereby increasing the magnetomotive force generated in it. When this force again reaches a predetermined level the reeds will again close thereby initiating another cycle.

It has been found that the greater the magnetomotive force applied by the permanent magnet the greater will be the operating frequency of this oscillating circuit since the reeds will open and close at an increasing frequency. Also, the duty cycle of the reed switch, that is, the amount of time that the reed switch is closed to the amount of time that it is open increases as a function of the amount of magnetomotive force applied by the permanent magnet.

Means are provided for increasing the magnetomotive force applied to the reed switch as a function of the deceleration of the vehicle. This means may take the form of a weight which is coupled to a spring loaded shaft having a permanent magnet mounted thereon with the axis of the magnetic field produced by the permanent magnet being positioned at an angle with respect to the axis of the reed switch and the axis of the magnetic field produced by the winding of the reed switch. As the vehicle decelerates, this weight will move the shaft and the permanent magnet such that the angle between the magnetic fields of the permanent magnet and that produced by the winding of the reed switch will decrease thereby applying an increasing magnetomotive force to the reeds of the reed switch.

As an alternative, this shaft and the permanent magnet may be rotated by a small hydraulic cylinder that is coupled to the brake system so that upon increasing the braking force, which produces a deceleration of the vehicle as a function of the force, the angle between the magnetic field produced by the permanent magnet and the magnetic field produced by the winding of the reed switch decreases as the function of the force. It can readily be appreciated by those skilled in the art that other means may be employed for increasing the amount of magnetomotive force applied to the reed switch as a function of the deceleration of the vehicle.

An object of the present invention is the provision of a deceleration indicator for an automotive vehicle in which a flashing lamp mounted on the rear of the vehicle is flashed at a frequency that is a function of the magnitude of the deceleration of the vehicle.

A further object of the invention is the provision of a deceleration indicator for an automotive vehicle in which the duty cycle of a flashing lamp located on the rear of the vehicle is increased as a function of the deceleration of the vehicle.

Another object of the invention is the provision of a deceleration indicator for an automotive vehicle in which both the frequency and the duty cycle of a flashing lamp positioned at the rear of the vehicle are increased as a function of the deceleration of the vehicle.

A further object of the invention is the provision of a deceleration indicator for an automotive vehicle in which a desired psychological effect is produced upon the driver of a vehicle following a decelerating vehicle by producing a flashing of a lamp located at the rear of the decelerating vehicle at a frequency and/or duty cycle that increases as a function of the deceleration of the vehicle.

Other objects and attendant advantages of the present invention will become more readily apparent as the specification is considered in connection with the attached drawings in which:

FIG. 4 is a graph disclosing the frequency and the duty cycle, or on-off time ratio, as a function of the angle theta shown in FIG. 1 which is the angle between the axis of the magnetic field of the permanent magnet and the axis of the reed switch and the magnetic field produced by its winding;

FIG. 5 is a schematic of another embodiment of the invention in which the deceleration of the vehicle is sensed by the amount of hydraulic pressure applied to the braking system of the vehicle; and FIG. 6 is a view of the reed switch disclosing how the amount of magnetomotive force required for closing and opening the reeds can be varied by moving the winding of the reed switch in an axial direction with respect to the reeds.

Figure 1:
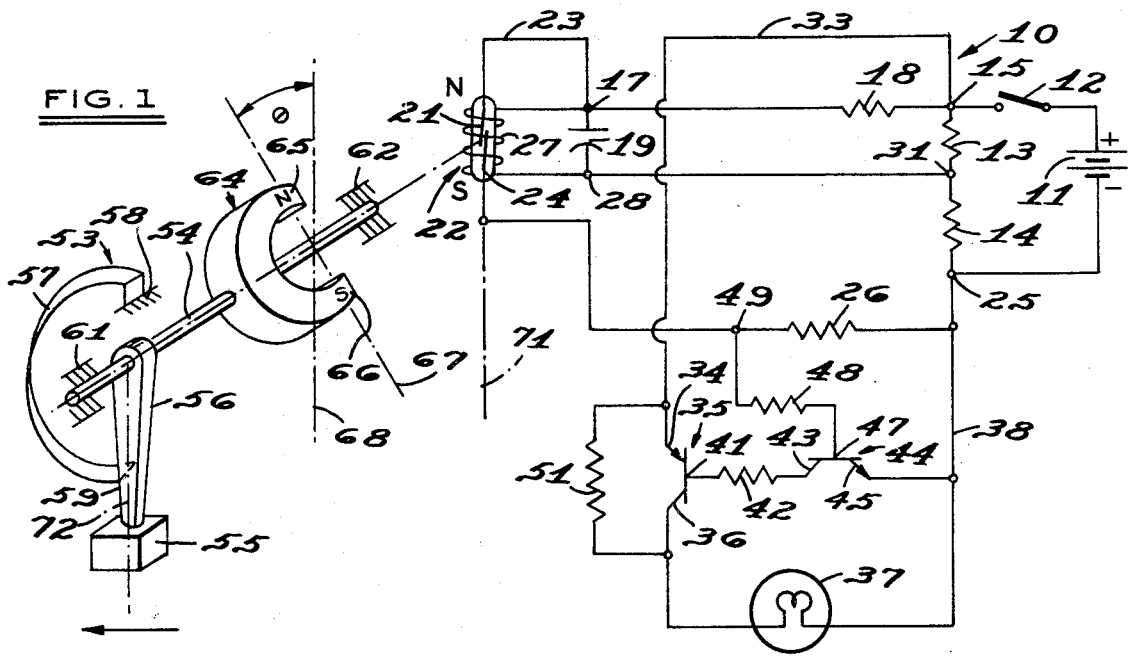
FIG. 1 is a schematic of the deceleration indicator of the present invention.

Referring now to the drawings in which like reference numerals designate like parts throughout the several views thereof, there is shown in FIG. 1 a schematic of the deceleration indicating device of the present invention including an electrical oscillating circuit 10 that has a source of electrical energy, for example, the electrical storage battery 11 of an automotive vehicle. The electrical storage battery 11 has one terminal, for example, the positive terminal, connected to a switch 12 which may be the ignition switch of the vehicle. The ignition switch is connected to a voltage divider comprising resistors 13 and 14 so that when the ignition switch 12 is closed the voltage divider will be positioned across the electrical storage battery 11. The positive terminal of the battery and the junction 15 are connected to a junction 17 through a resistor 18. The junction 17 in turn is connected to one plate of a capacitor 19 and is also connected to a first reed 21 of reed switch 22 through a lead 23.

The other reed 24 of the reed switch 22 is connected to a junction 25 through resistor 26 and this junction is also connected to the other terminal of the electrical storage battery 11, for example, the negative terminal, and to the voltage divider comprising resistors 13 and 14.

The junction 17 and one plate of the capacitor 19 are connected to one terminal of winding 27 of the reed switch 22, while the other plate of the capacitor 19 is connected to the other terminal of the winding 27 through the lead 60 connected to a junction 28. The junction 28 is in turn connected to a junction 31 positioned between resistors 13 and 14. It can be seen, therefore that the voltage applied to the capacitor 19 when the reeds 21 and 24 of the reed switch 22 are open is a predetermined fraction of the terminal voltage of the battery 11 as determined by the values of the resistors 13 and 14.

The junction 15 and hence the positive terminal of the electrical storage battery 11, when the switch 12 is closed, is connected through a lead 33 to the emitter 34 of a transistor 35. The collector 36 of the transistor 35 is connected to one terminal of a warning lamp 37 that may be mounted on the rear of an automotive vehicle. The other terminal of the lamp 37 is connected to the junction 25 and hence the negative terminal of electrical storage battery 11 through a lead 38. The base 41 of transistor 35 is connected through a current limiting resistor 42 to the collector 43 of a transistor 44. The emitter 45 of the transistor 44 is in turn connected to the lead 38 and hence to the negative terminal of the electrical storage battery 11. The base 47 of transistor 44 is connected through a current limiting resistor 48 to a junction 49 positioned intermediate the resistor 26 and the second reed 24 of the reed switch 22.

A resistor 51 is connected across the emitter 34 and collector 36 of the transistor 35. It should have a value such that current flow through it and the filament of the lamp 37 when the transistor 35 is in the non-conducting state will keep the filament temperature of the lamp 37 high but not at the glowing point. This considerably decreases the rating of the transistor 35 by reducing the value of instantaneous current flowing into what would otherwise be a cold filament. The value of the resistor 51 can also be chosen so that the filament of the lamp 37 glows at a low intensity when the transistor 35 is in the nonconducting state. The filament will then glow at a maximum intensity when the transistor 35 is switched to its conducting state.

A deceleration responsive means, generally designated by the reference numeral 53, is mounted in an automotive vehicle in close proximity to the reed switch 22. It comprises a shaft rotatably mounted on an axis substantially transverse to the longitudinal axis of the vehicle and to the direction of forward motion of the automotive vehicle. A weight 55 is mounted on a depending radial arm 56 connected to the shaft 54 and a spring 57 is connected to a structural member of the automotive vehicle at 58 and also is connected to the arm 56 at 59. As can be seen by the drawing, the shaft 54 is rotatably supported in a pair of bearings 61 and 62 and should be in a position so that the axis of the shaft 54 intersects the center of the reed switch 22.

A permanent magnet 64 is fixedly mounted on the shaft 54 and it has a north pole 65 and a south pole 66 that are positioned in a line 67 that is coplanar with a line 68 which is parallel to and coplanar with the axis 71 of the reed switch 22. It should also be noted that in the position shown in the drawing, when the vehicle is not under a deceleration above a predetermined magnitude, that a line 72 passing through the center of the weight 55 and the center of the shaft 54 is parallel to the axis 71 of the reed switch 22 and the line 68 and is also coplanar with respect to these two lines. It should also be noted that the axis of the shaft 54 should be perpendicular to the axis 71 of the reed switch 22.

The permanent magnet 64 should be poled so that the magnetomotive force produced by the permanent magnet aids the magnetomotive force produced by current flow from the junction 17 through the winding 27 of the reed switch 22. The axis of the magnetic field of the permanent magnet represented by the line 67 should be positioned at a substantial angle, shown as theta in the drawings, to the lines 68 and 71 and hence the axis of the reed switch and the magnetic field produced by winding 27 when the automotive vehicle is not under a deceleration above a predetermined minimum.

In the operation of the deceleration indicator of the present invention, the reed switch 22 will remain open, that is, the reeds 21 and 24 will remain open until the vehicle decelerates to a deceleration above a predetermined minimum. If the vehicle is not decelerating or the deceleration is under this predetermined minimum and with the igniton switch 12 closed, the capacitor 19 charges to a voltage determined by the voltage divider composed of resistors 13 and 14, and it is a predetermined fraction of the terminal voltage of the electrical storage battery 11. This voltage on the capacitor 19 provides a constant voltage across the winding 27 of the reed switch 22 and causes a predetermined magnetomotive force to be generated by this winding in a direction to close the reeds 21 and 24. This voltage, however, is selected so that the magnetomotive force developed in the winding 27 is insufficient to close the reeds when the vehicle is not decelerating or the deceleration is below the predetermined minimum.

When the vehicle begins to decelerate and reaches a predetermined minimum deceleration, the weight 55 will move in the direction of the forward motion of the vehicle against the bias of spring 57. This will rotate the shaft 54 and the permanent magnet 64 in a direction to decrease the angle theta. This brings the magnetic field of the permanent magnet more nearly in line with the magnetic field produced by the winding 27 and increases the magnetomotive force effective upon the reed switch 22. When this angle is reduced to a predetermined value and the magnetomotive force on the reed switch is increased to a predetermined value, the reed switch or relay 22 will close thereby closing the reeds 21 and 24. This action causes current flow from the junction 17 through the closed reeds 21 and 24 to the junction 49, through the resistor 26 back to the junction 25 which is at a potential of the negative terminal of the electrical storage battery 11. Such action raises the potential of the junction 49 and hence the base 47 of transistor 44 with respect to the emitter 45 and current may flow from the junction 49 through resistor 48, base 47 and emitter 45 back to lead 38 thereby turning on transistor 44. This permits current flow from the emitter 34 which is at the potential of the positive terminal of electrical storage battery 11 of transistor 35 through its base 41, resistor 42 and collector 43 and emitter 45 of transistor 44 to the lead 38 which is at the potential of the negative terminal of electrical storage battery 11. This turns on the transistor 35 and permits current flow through lamp 37 via junction 15, lead 33, emitter 34 and collector 36 of transistor 35 and back to the negative terminal of the electrical storage battery 11 through the lead 38 and the junction 25.

The closing of the reeds 21 and 24 also causes the capacitor 19, that is, the plate connected to the junction 17, to discharge through the reeds, the junction 49 and the resistor 26 toward the negative voltage as represented by the negative terminal of the battery 11 that is present at the junction 25. As the capacitor 19 discharges, the current flow through the winding 27 decreases as a function of the decreasing voltage on the capacitor 19 and the total magnetomotive force on the reeds 21 and 24 will decline or decrease to the point where it is no longer sufficient to hold the reeds closed. At this point the reeds will open, the transistor 44 will be switched to its nonconducting state as will transistor 35 thereby de-energizing the filament of the lamp 37.

At this time, the capacitor 19 will again commence to charge toward the voltage that is present across the resistor 13 of the voltage dividers 13 and 14. With the permanent magnet assumed to be in the same position as it was previously due to the deceleration of the vehicle, this increasing voltage across the capacitor 19 will cause increasing current flow through the winding 27 to again increase the magnetomotive force to the point where the reeds close thereby switching on transistors 44 and 35 and again energizing the filament of the warning lamp 37. It can be readily appreciated that this cycle will continue at a given repetition rate or frequency as long as the vehicle is under the same deceleration so that the magnetic field of the permanent magnet is at a given angle with respect to the magnetic field produced by the winding 27 as represented by the angle theta.

The frequency of the operation of the electrical oscillating circuit described above, including the reed switch 22, and hence the frequency of flashing of the lamp 37, is a function of the position of the axis of the magnetic field represented by the line 67 of the permanent magnet 64 with respect to the axis of the magnetic field produced by the winding 27 as represented by the line 71, or stated another way, as a function of the angle theta between these axes. The frequency of operation increases as the angle theta decreases. The duty cycle of this operating circuit, including the reed switch 22, as well as the duty cycle of the lamp 37 that is the on-time of these two components with respect to the off-time, is also a function of the angle theta and it increases as the angle theta decreases.

Figure 2:
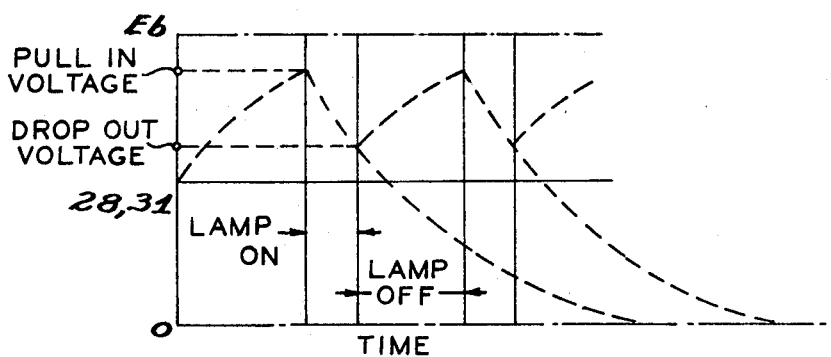
FIG. 2 is a graph showing the frequency and duty cycle of the oscillating circuit and flashing lamp of the present invention when the deceleration of the vehicle is at a given value.
Figure 3:
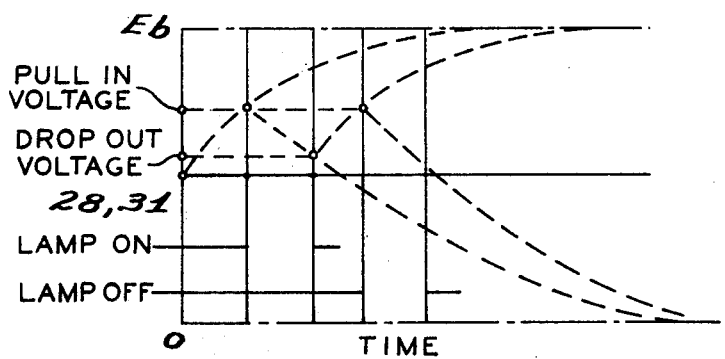
FIG. 3 is a graph similar to that of FIG. 2 at a deceleration value greater than the deceleration value used in FIG. 2 and showing the increased frequency and duty cycle of the oscillating circuits and flashing lamp.

Referring now to FIGS. 2, 3 and 4, the frequency dependence and the duty cycle dependence of the oscillating circuit with respect to the angle theta, which is dependent upon the deceleration of the vehicle as previously explained, can readily be seen. FIG. 2 is a graph of the voltage applied to the winding 27 as the result of the capacitor 19 charging and discharging with respect to time and discloses a given frequency of operation of the reed switch 22 and of the flashing of the warning lamp 37. It also discloses the duty cycle of the reed switch 22 and the flashing lamp 37. FIG. 2 discloses this frequency of operation and duty cycle under a predetermined deceleration of the vehicle in which the magnetic field produced by the permanent magnet 64 has been rotated into a position as represented by the angle theta where it will aid the magnetic field of the winding 27 and cause the oscillations to occur. The base line of this graph is the voltage of the negative terminal of the source of electrical energy 11 or that which prevails at the junction 25. The next line is the voltage that prevails at the junctions 28 and 31 and is the voltage set by the voltage dividers 13 and 14. The next line is the terminal voltage of the electrical storage battery 11 as denoted by the symbol $E_b$. The voltage across the capacitor 19, therefore, that is supplied by the voltage divider 13–14 being connected across the source of electrical energy 11 is that from the line 31–28 to the line $E_b$.

When the deceleration of the vehicle is below a predetermined minimum and therefore the angle theta above a predetermined maximum, the capacitor 19 may charge to the full voltage between the line designated 31–28 and $E_b$ and this voltage will be insufficient to cause sufficient current flow through the winding 27 to close the reeds 21 and 24. However, with the vehicle under predetermined minimum deceleration and the axis of the magnetic field of the permanent magnet 64 brought more nearly into alignment with the axis of the magnetic field produced by the winding 27, the magnetomotive force produced by the winding 27 and the permanent magnet 64 will be sufficient to close the reed switch at some predetermined pull-in voltage, as shown on the graph. This, as previously stated, will cause the capacitor 19 to discharge toward the negative voltage of the electrical storage battery 11 and at some other predetermined lower voltage, designated the drop-out voltage, this voltage will be reduced to the point where the magnetomotive force on the reeds 21 and 24 is insufficient to maintain the reeds in the closed position and they will open. This will, as previously explained, de-energize the lamp 37 and cause the capacitor 19 to again start charging toward the voltage set by the voltage divider 13–14 or, as shown on the graph, the voltage difference between that which prevails at the junctions 28–31 and the terminal voltage $E_b$ of the electrical storage battery 11. Under constant deceleration conditions, the reed switch will again close at a given pull-in voltage thereby energizing the lamp 37 and causing the capacitor 19 to discharge again toward the voltage of the negative terminal of the electrical storage battery 11 found at the junction 25.

If the vehicle is decelerated at a deceleration of a greater magnitude than that assumed for FIG. 2, the frequency of operation of the oscillating circuit, including the reed switch 22 and the frequency of the flashing of the lamp 37 as well as the duty cycle of these two components, will be increased. The reason for this can be seen in studying FIG. 3. The magnetomotive force that is effective in closing the reeds 21 and 24 supplied by the permanent magnet 64 increases with increasing deceleration of the vehicle since the magnetic field of the permanent magnet is brought more into alignment with the field caused by the winding 27. As a result, it will take less voltage applied by the capacitor 19 to the winding 27 to close the reeds 21 and 24 than it would if the conditions of lower deceleration prevailed as assumed in the discussion of FIG. 2. Therefore, the pull-in voltage as the capacitor 19 charges is considerably less than prevailed under the conditions of FIG. 2. It has also been found that the drop-out voltage will be reduced somewhat and that the capacitor in discharging toward the junction 25 will do so at a slower rate since it has a lesser charge or voltage across it when the reeds close. The action of the circuit is the same as that discussed above and in relation to FIG. 2 except that it can be seen with respect to FIG. 3 that not only is the frequency of operation of the circuit increased but that the duty cycle of the circuit is increased. This results, of course, in an increased frequency and duty cycle of the flashing warning lamp 37.

Referring now to FIG. 4, the frequency of operation of the reed switch and the lamp 37 is shown on the ordinate at the left while the on-off time ratio or duty cycle is shown at the ordinate at the right. The abscissa is the angle theta, shown in FIG. 1, in degrees. It can thus be seen that when the deceleration of the vehicle reaches a predetermined magnitude at which time theta is reduced to a predetermined angle, the circuit will commence to operate and the lamp 37 will be flashed at a frequency which is a function of the decreasing angle theta which is in turn a function of the deceleration of the vehicle. The on-off time ratio or the duty cycle is also increased with a decreasing angle of theta and hence it is increased with an increasing vehicle deceleration.

FIG. 5 discloses the same circuit as FIG. 1 in block diagram form and it operates in the manner discussed above in relationship to FIGS. 1 through 4. The only difference is that the angle theta is decreased with increasing vehicle deceleration, not by a movable weight that responds directly to vehicle deceleration, but by means of a small fluid operated piston 81 that is enclosed in a chamber 82. The piston 81 is attached to a rack 83 by means of a rod 84 and the rack in turn is coupled to a pinion 85 attached coaxially to the shaft 54. One side of the piston 81 is connected to the pressure side of the master cylinder through an orifice 87 while the other side is connected to the drain side of the master cylinder reservoir through an orifice 88. It can be seen, therefore, that when the vehicle operator applies his brakes to decelerate the vehicle, that the permanent magnet 64 will be rotated to decrease the angle theta against the bias of the spring 54 and will be positioned as a function of the deceleration and the braking force.

The diameter of the piston 81 can be made very small since virtually no work is done in displacing the magnet 64. Thus, the volume of hydraulic fluid required for operating the piston 81 is very small and does not require extensive modification to the braking system of a production automotive vehicle.

Referring now to FIG. 6, the pull-in and drop-out voltage or ampere turns required for the operation of the reeds 21 and 24 of the reed switch 22 may be adjusted by sliding the winding or coil 27 axially with respect to the place where the needs 21 and 24 come into contact.

In order to accomplish this, the reed switch 22 is supported between two walls 91 and 92 that should be made of a nonferrous or nonmagnetic material, such as plastic. The winding 27 is carried in a bobbin 94 that is spring urged in one direction by a coaxial nonferrous or nonmagnetic spring 95 positioned about the reed switch. On the other side of the bobbin a nonferrous adjusting screw and lock nut designated 96 are employed for moving the bobbin 94 and hence the winding 27 against the bias of the spring 95. It can be readily appreciated that the closer the bobbin 94 and the coil 27 to the contact point of the reeds 21 and 24 the greater will be the action of the magnetomotive force produced in the winding 27. Thus, sliding of the bobbin 94 and the winding 27 toward the relay contacts will decrease the amount of voltage across capacitor 19 and winding 27 required to close the reeds 21 and 24 under a constant deceleration.

The present invention thus provides a deceleration indicator for an automotive vehicle in which the frequency and/or the duty cycle of a warning lamp positioned at the rear of the vehicle is increased as the deceleration of the vehicle is increased.

I claim:

1. In an automotive deceleration indicator the combination comprising, a lamp mounted on the rear of the vehicle, an oscillating electrical circuit connected to said lamp for flashing said lamp in response to the oscillations of said electrical circuit, a deceleration responsive means mounted on said vehicle, and means coupling said oscillating electrical circuit and said deceleration responsive means for increasing the frequency of said oscillating electrical circuit and the flashing of said lamp as a function of the magnitude of the decleration of the vehicle, said oscillating electrical circuit comprising, a reed switch having first and second reeds and a winding positioned about said reeds, a source of electrical energy, and means coupled to said source of electrical energy, one of said reeds and said winding for applying a predetermined fraction of the voltage of the terminal voltage of said source of electrical energy to said winding when said reeds are open and for reducing said predetermined fraction when said reeds are closed, said means coupling said oscillating circuit and said deceleration responsive means comprising, a permanent magnet positioned adjacent said reed switch for aiding the magnetomotive force of said winding when said reeds are closed and means for increasing the magnetomotive force applied by said permanent magnet to said reed switch as a function of the deceleration of the vehicle.

2. In an automotive deceleration indicator the combination comprising, a lamp mounted on the rear of the vehicle, an oscillating electrical circuit connected to said lamp for flashing said lamp in response to the oscillations of said electrical circuit, a deceleration responsive means mounted on said vehicle, and means coupling said oscillating electrical circuit and said deceleration responsive means for increasing the frequency of said oscillating electrical circuit and the flashing of said lamp as a function of the magnitude of the deceleration of the vehicle, said means coupling said oscillating electrical circuit and said deceleration responsive means also increasing the duty cycle of said oscillating electrical circuit and the flashing of said lamp as a function of the magnitude of the deceleration of said vehicle, said oscillating electrical circuit comprisinging, a reed switch having first and second reeds and a winding positioned about said reeds, a source of electrical energy, and means coupled to said source of electrical energy, one of said reeds and said winding for applying a predetermined fraction of the voltage of the terminal voltage of said source of electrical energy to said winding when said reeds are open and for reducing said predetermined fraction when said reeds are closed, said means coupling said oscillating circuit and said deceleration responsive means comprising, a permanent magnet positioned adjacent said reed switch for aiding the magnetomotive force of said winding when said reeds are closed and means for increasing the magnetomotive force applied by said permanent magnet to said reed switch as a function of the deceleration of the vehicle.

3. In an automotive deceleration indicator the combination comprising, a lamp mounted on the rear of the vehicle, an oscillating electrical circuit connected to said lamp for flashing said lamp in response to the oscillations of said electrical circuit, a deceleration responsive means mounted on said vehicle, and means coupling said oscillating electrical circuit and said deceleration responsive means for increasing the duty cycle of said oscillating electrical circuit and the flashing of said lamp as a function of the magnitude of the deceleration of the vehicle, said oscillating electrical circuit comprising, a reed switch having first and second reeds and a winding positioned about said reeds, a source of electrical energy, and means coupled to said source of electrical energy, one of said reeds and said winding for applying a predetermined fraction of the voltage of the terminal voltage of said source of electrical energy to said winding when said reeds are open and for reducing said predetermined fraction when said reeds are closed, said means coupling said oscillating circuit and said deceleration responsive means comprises a permanent magnet positioned adjacent said reed switch for aiding the magnetomotive force of said winding when said reeds are closed and means for increasing the magnetomotive force applied by said permanent magnet to said reed switch as a function of the deceleration of the vehicle.

4. The combination of claim 1 in which said permanent magnet is mounted on a rotatable shaft having an axis substantially transverse to the longitudinal axis of the vehicle, said shaft has a depending weight, and said spring means urges said shaft into a position where there is a substantial angle between the direction of the magnetic field produced by said winding and the magnetic field produced by said permanent magnet, said weight reducing the angle between the direction of the magnetic field produced by said winding and the magnetic field produced by said permanent magnet as a function of the magnitude of the deceleration of the vehicle.

5. The combination of claim 2 in which said permanent magnet is mounted on a rotatable shaft having an axis substantially transverse to the longitudinal axis of the vehicle, said shaft has a depending weight, and said spring means urges said shaft into a position where there is a substantial angle between the direction of the magnetic field produced by said winding and the magnetic field produced by said permanent magnet, said weight reducing the angle between the direction of the magnetic field produced by said winding and the magnetic field produced by said permanent magnet as a function of the magnitude of the deceleration of the vehicle.

6. The combination of claim 3 in which said permanent magnet is mounted on a rotatable shaft having an axis substantially transverse to the longitudinal axis of the vehicle, said shaft has a depending weight, and said spring means urges said shaft into a position where there is a substantial angle between the direction of the magnetic field produced by said winding and the magnetic field produced by said permanent magnet, said weight reducing the angle between the direction of the magnetic field produced by said winding and the magnetic field produced by said permanent magnet as a function of the magnitude of the deceleration of the vehicle.

7. In a deceleration indicator for an automotive vehicle the combination comprising, a lamp mounted on the rear of the automotive vehicle, a source of electrical energy, a reed switch having a first reed, a second reed and a winding positioned about said reeds in a position to apply a magnetomotive force to said reeds in a direction to close said reeds when energized, said first and second reeds being coupled in series with said source of electrical energy, a capacitor connected across said winding and having one terminal connected to said first reed, means coupled to said source of electrical energy and said capacitor for supplying a voltage to said capacitor that is a fraction of the terminal voltage of said source of electrical energy and is insufficient to produce sufficient magnetomotive force in said winding to close said reeds, a permanent magnet mounted adjacent said vehicle in a position adjacent said reed switch and being poled to produce a magnetomotive force on said reeds in a direction to close said reeds, a deceleration responsive means mounted in the vehicle and coupled to said permanent magnet for increasing the magnetomotive force applied to said reeds of said reed relay as a function of the deceleration of said vehicle, said magnetomotive force being sufficient together with the magnetomotive force of said winding to close said reeds when the deceleration of the vehicle reaches a predetermined value, said capacitor discharging through said reed switch when said reeds are closed thereby reducing the magnetomotive force applied to said reeds from said winding until the magnetomotive force applied by said winding and said permanent magnet to said reeds is no longer sufficient to keep said reeds closed whereupon said capacitor again charges and applies sufficient magnetomotive force to cause said reeds to close, and means coupled to said source of electrical energy and said reed switch for energizing said warning lamp when said reeds are closed.

References Cited

UNITED STATES PATENTS

| | | | |
|---|---|---|---|
| 2,446,870 | 8/1948 | Davis | 340—62 XR |
| 2,574,616 | 11/1951 | Brown | 340—262 |
| 3,096,505 | 7/1963 | Richins | 340—71 XR |
| 3,431,556 | 3/1969 | Johnson | 340—72 |

ALVIN H. WARING, Primary Examiner

U.S. Cl. X.R.
73—517; 340—262